US007314214B2

(12) United States Patent
Colby et al.

(10) Patent No.: US 7,314,214 B2
(45) Date of Patent: Jan. 1, 2008

(54) POWER CLAMP

(75) Inventors: Douglas D. Colby, Clarkston, MI (US); Matthew Rentz, Shelby Township, MI (US); Henry Dykstra, Lenox, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 11/454,580

(22) Filed: Jun. 15, 2006

(65) Prior Publication Data

US 2006/0290042 A1 Dec. 28, 2006

Related U.S. Application Data

(60) Provisional application No. 60/694,542, filed on Jun. 27, 2005.

(51) Int. Cl.
*B23Q 3/08* (2006.01)

(52) U.S. Cl. .......................................... 269/32; 269/228

(58) Field of Classification Search .................. 269/32, 269/228, 237, 24–27, 20
See application file for complete search history.

(56) References Cited

U.S. PATENT DOCUMENTS

| | | | | |
|---|---|---|---|---|
| 5,884,903 | A * | 3/1999 | Sawdon | 269/32 |
| 6,279,886 | B1 * | 8/2001 | Grossart | 269/24 |
| 6,612,557 | B2 * | 9/2003 | Sawdon et al. | 269/32 |
| 2001/0038175 | A1 * | 11/2001 | Nagai et al. | 269/237 |
| 2005/0121843 | A1 * | 6/2005 | Maffeis | 269/32 |

* cited by examiner

*Primary Examiner*—Lee D. Wilson
(74) *Attorney, Agent, or Firm*—Raggio & Dinnin, P.C.

(57) ABSTRACT

A power clamp for use in a manufacturing environment. The power clamp including a base and an extruded body secured to the base. The power clamp also includes a cylinder having a rod secured to the body. A shaft is rotatably supported by the body of the clamp. The clamp also includes a bar connected to the shaft and a rotator pin engaged with the shaft. The clamp also includes a link member connected to the rotator pin on one end and to the rod on the opposite end.

20 Claims, 11 Drawing Sheets

Fig. 1D.
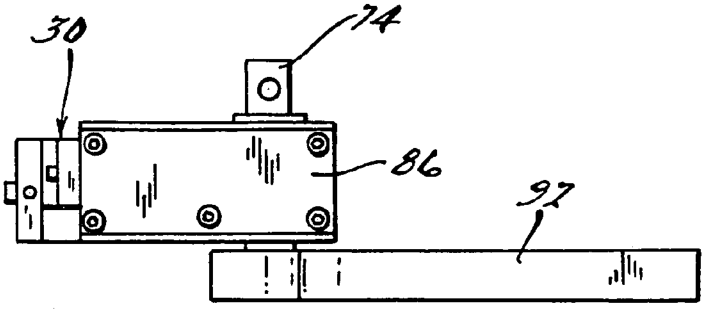
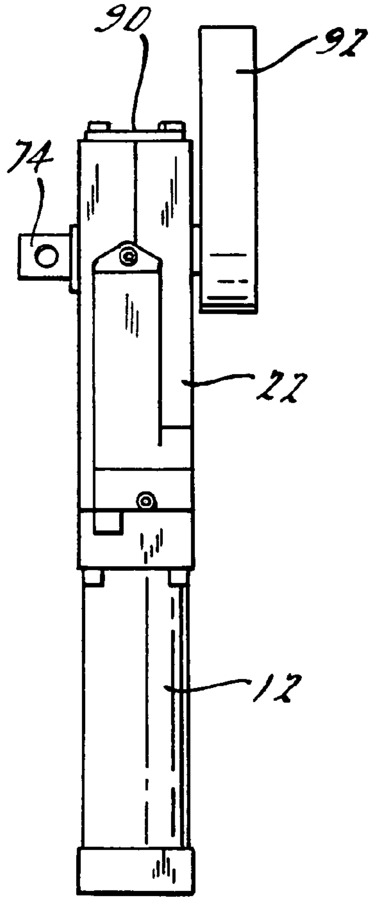
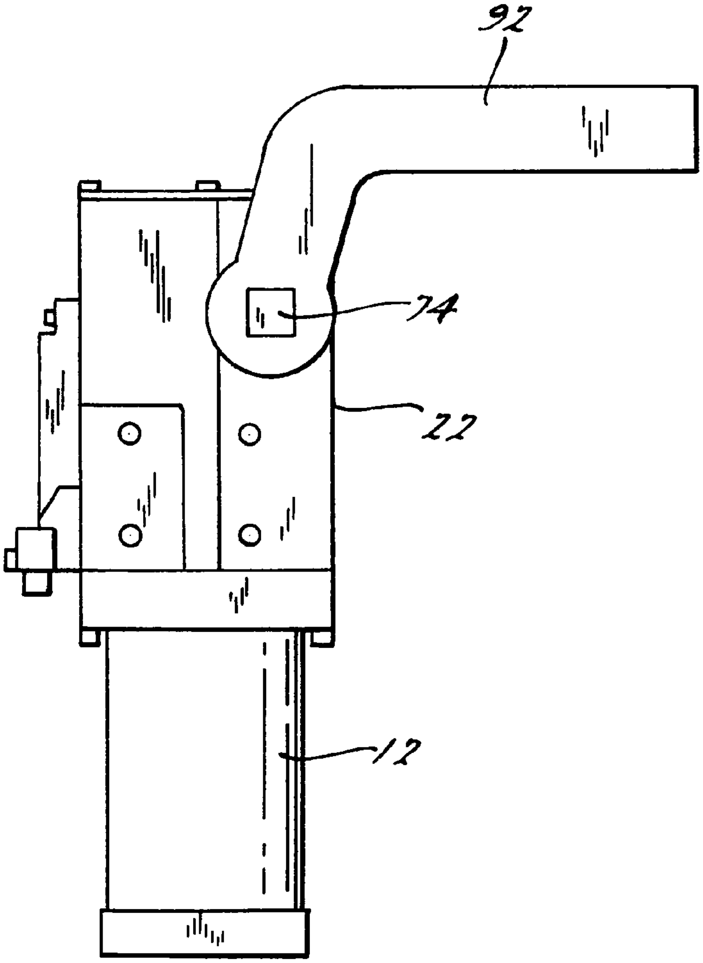
Fig. 1B.
Fig. 1C.

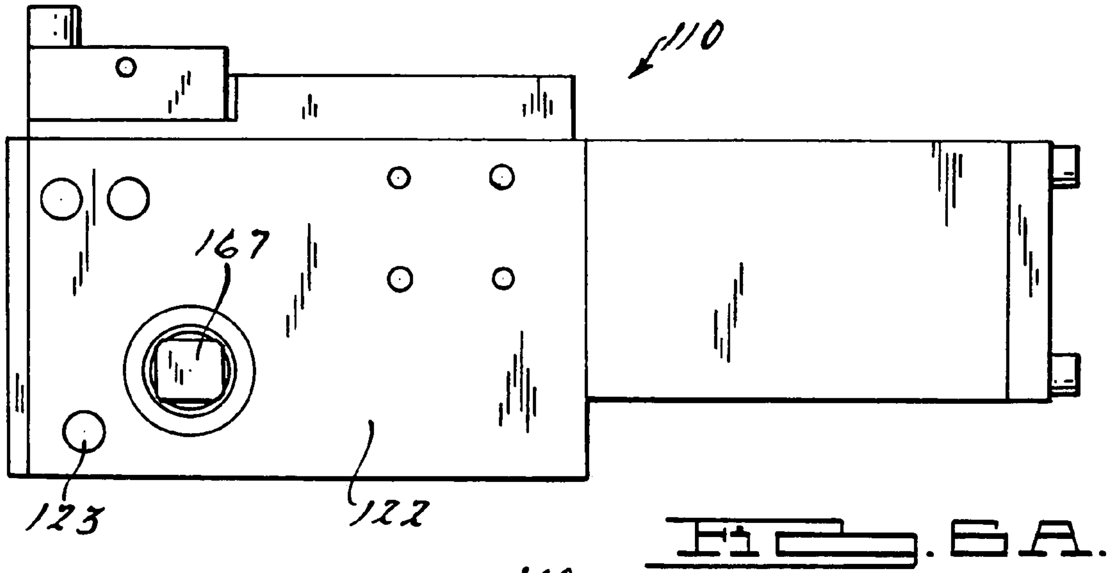
FIG. 6A.
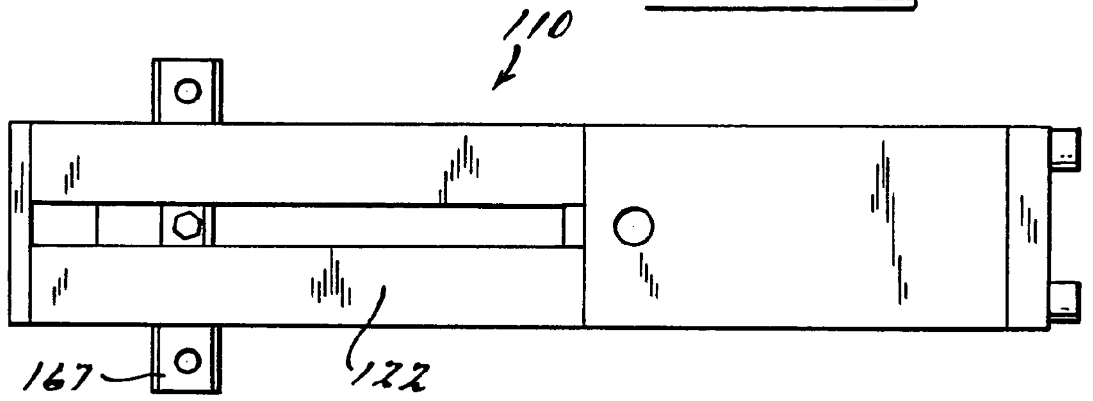
FIG. 6B.
FIG. 7.
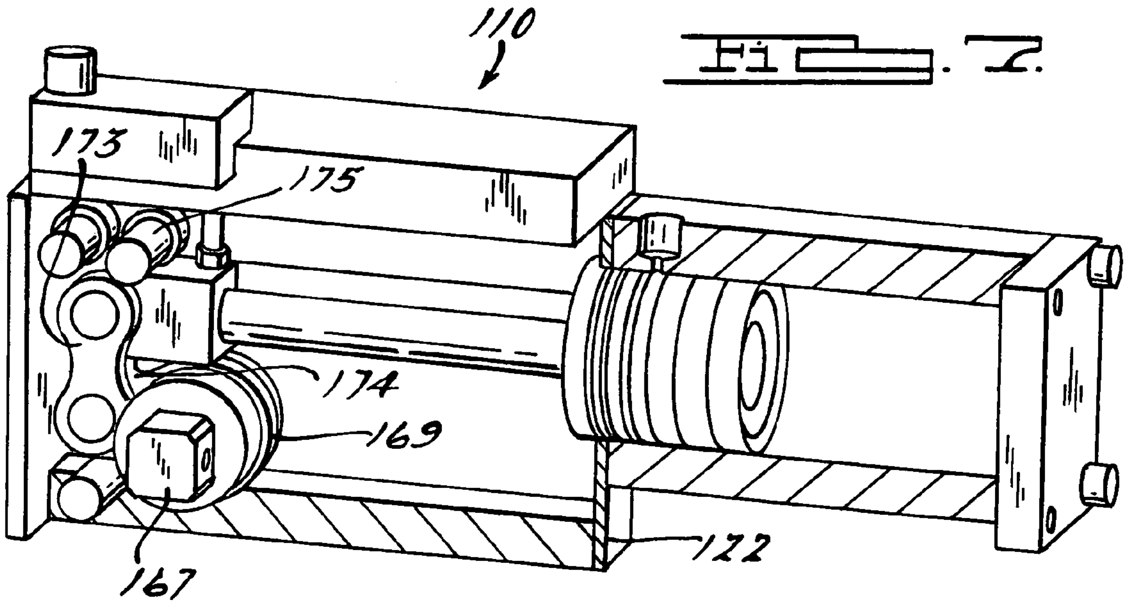

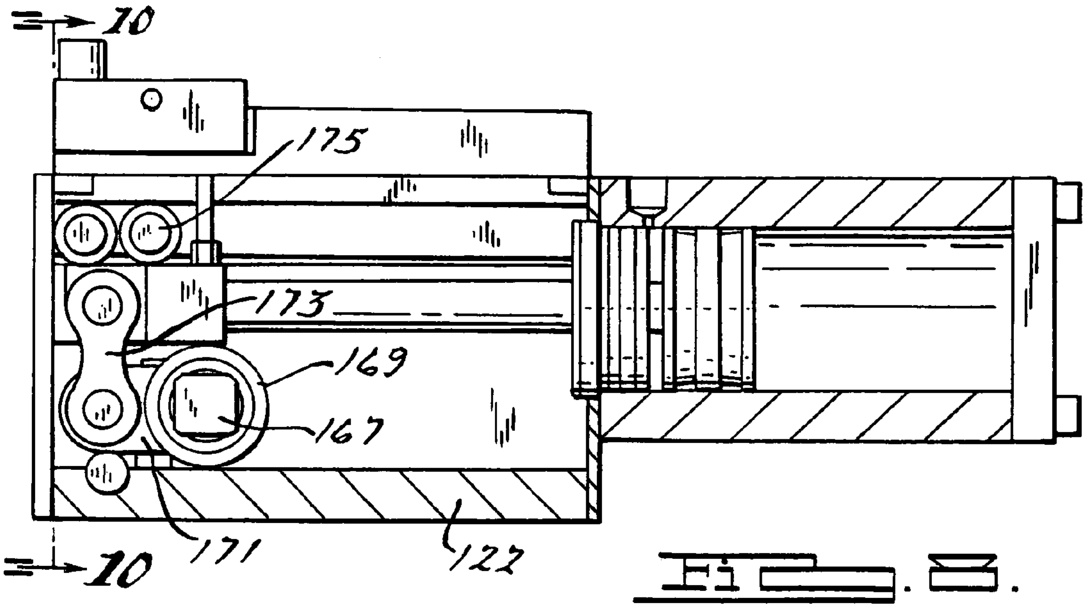
FIG. 8.
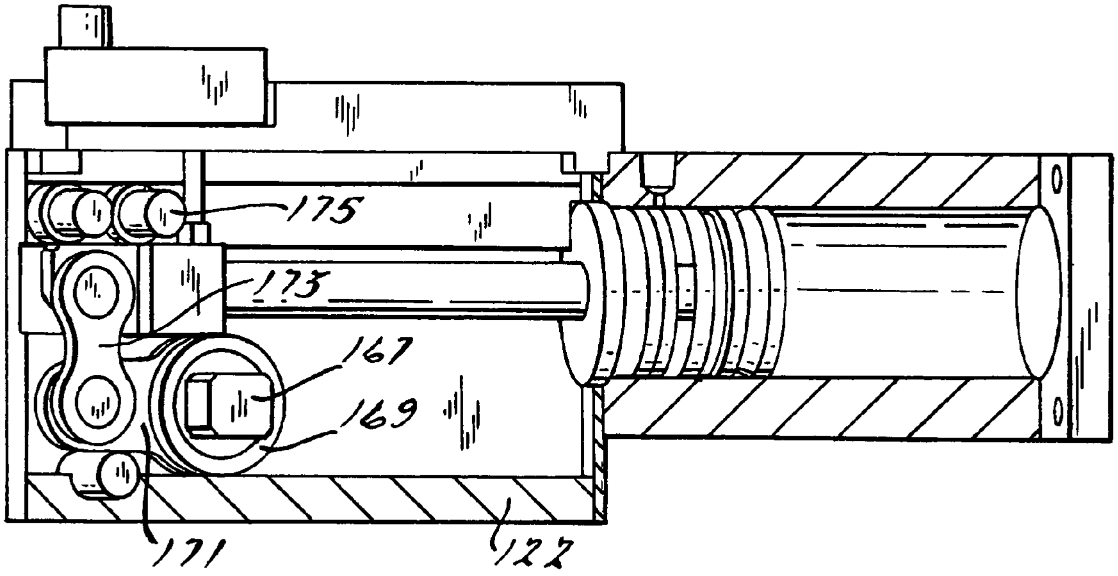
FIG. 9.
FIG. 10.
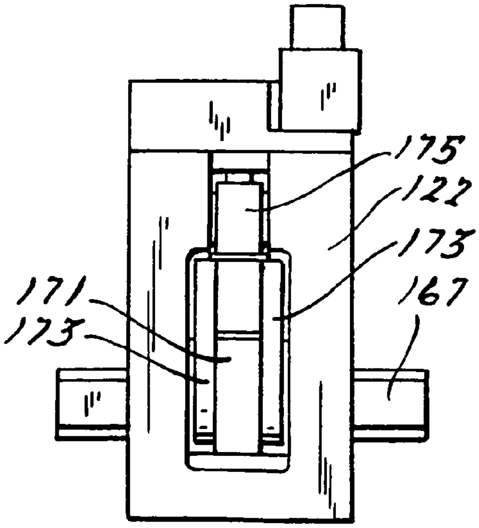

FIG. 11.
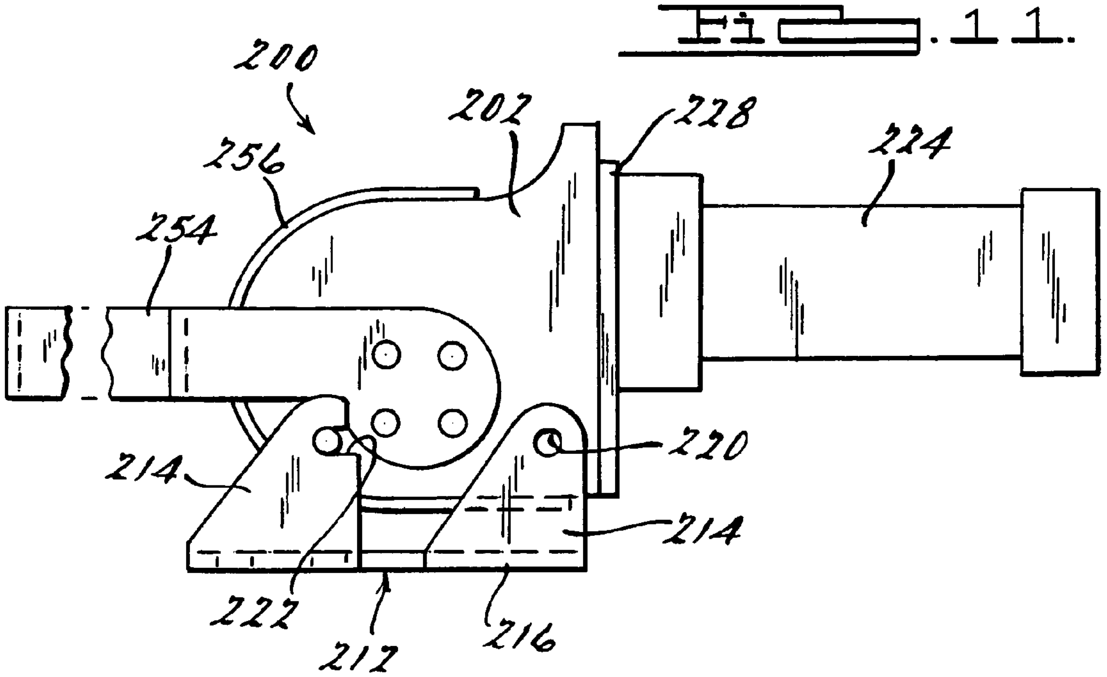
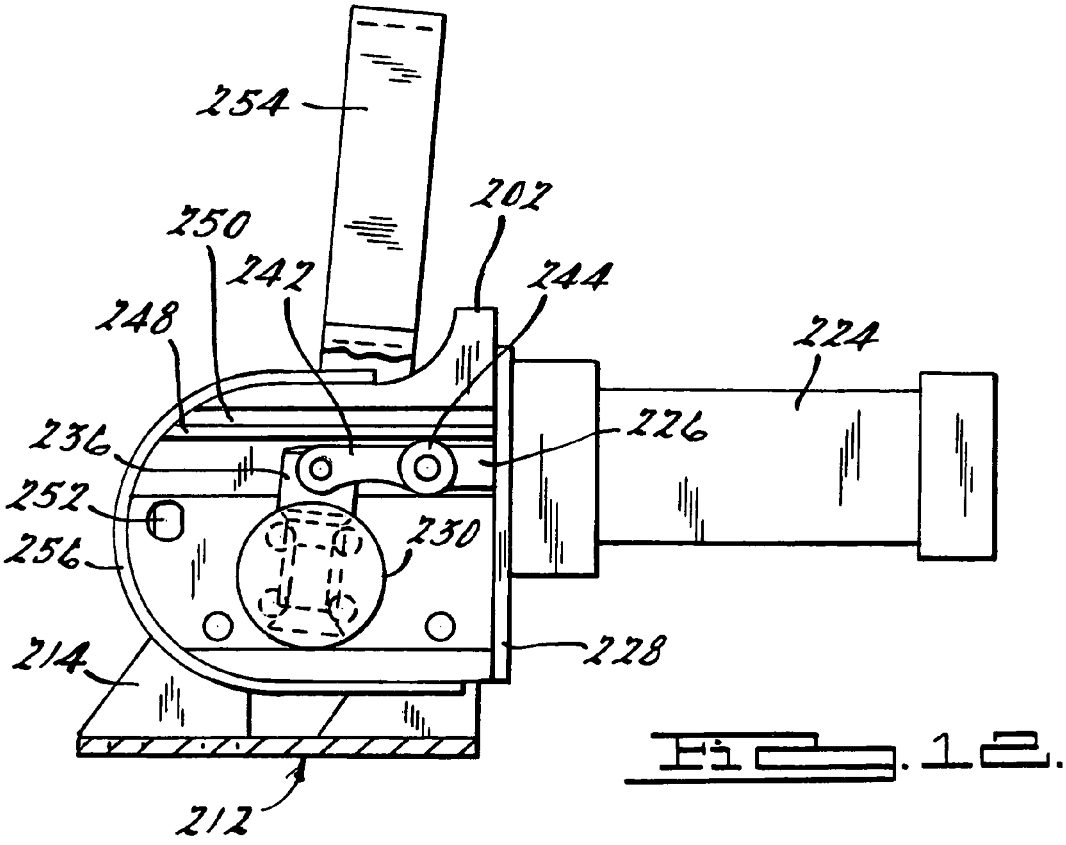
FIG. 12.

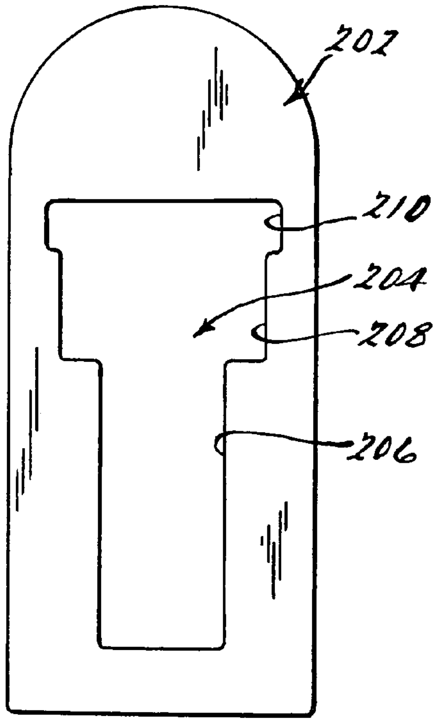
Fig. 15.
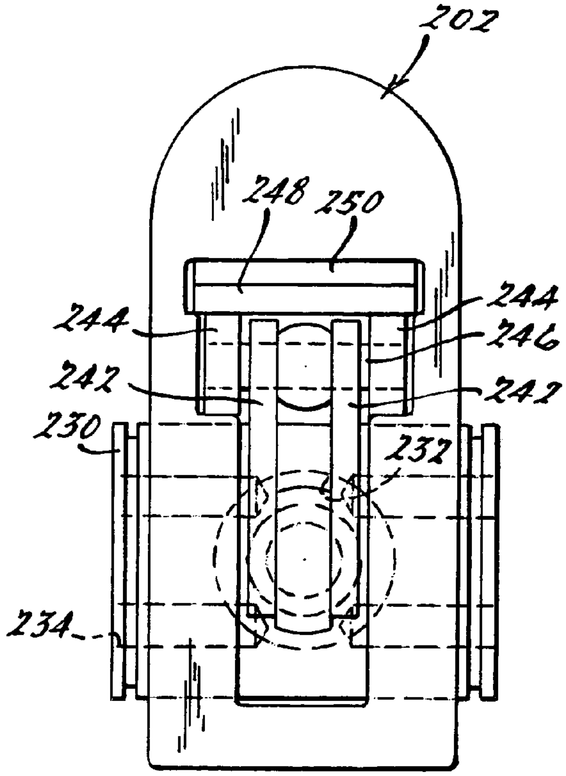
Fig. 16.
Fig. 17.
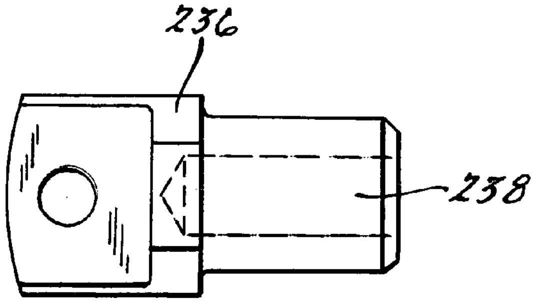
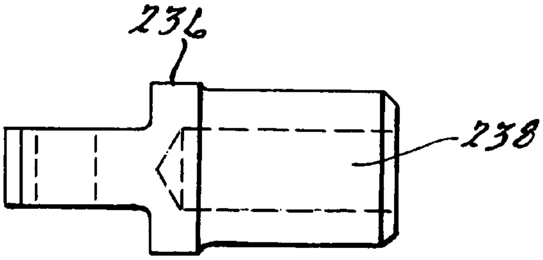
Fig. 18.

POWER CLAMP

Continuation of U.S. Provisional Patent Application Ser. No. 60/694,542—Filed: Jun. 27, 2005

BACKGROUND OF THE INVENTION

This invention broadly relates to a new power clamp mechanism which has unique features and which can be manufactured economically and at a low cost. More particularly, this invention relates to a new power clamp mechanism which is made from an extruded body that may be a one piece extruded portion or two piece extruded portion.

In the past, power clamping mechanisms have been relatively expensive to manufacture and also generally required the usage of two separate body components, namely one body component which houses a piston and rod assembly for driving the clamp and a second body component used to house a linkage mechanism which is connected to a clamp arm for opening and closing the clamp into a clamped locked position or open position. Many of these prior art clamps required very complex linkage systems and required extremely high forces to get into a clamped position. Furthermore, many of these prior art power clamps have machined body portions which increases the cost of manufacturing and repairing such clamping devices.

Therefore, there is a need in the art for an improved power clamp which uses extruded body parts. There also is a need in the art for a power clamp that is cheaper to manufacture, requires fewer parts and is more robust and reliable.

Currently, it is the primary object of this invention to provide a unique power clamp mechanism which can be produced at a relatively low cost and which is formed through the use of a single or a plurality of extruded body members.

Another object of the present invention is to provide a new power clamp mechanism which provides its power locking operation to the clamp arm through the usage of either a wedge lock mechanism or toggle link mechanism.

Another object of the present invention is to provide a specially designed power clamp apparatus which utilizes an improved linkage system to secure the clamp arm in a closed or clamped position.

Another object of the present invention is to provide a new power clamp mechanism which is capable of using at least three different types of clamp arms or bars including but not limited to a U-arm, a side arm/U-arm, or a regular side arm type clamping arm.

Another object of the present invention is to provide a new power clamp mechanism that is capable of operating with an electronic switch system.

Another object of the present invention is to provide a new power clamp mechanism that is capable of operating with any known type of cylinder or any other known type of linear motion mechanism.

It is yet another object of the present invention to provide a low cost, more robust and easy to maintain power clamp that is capable of multiple application uses in multiple sizes and with multiple holding forces.

Other objects, features and advantages of the present invention will become apparent from the subsequent description taken in conjunction with the accompanying drawings.

SUMMARY OF THE INVENTION

Briefly stated, the present invention involves a power clamp apparatus which includes a cylinder. The cylinder includes a piston rod and piston arranged within a bore of the cylinder. The piston rod extends from one end of the cylinder. An extruded body or body members are attached to an end of the cylinder. The extruded body has a bore or chamber therein. A clevis is arranged on an end of the piston rod wherein the clevis is attached to a drive shaft on an opposite end thereof. The clamp apparatus also includes a stop block which forms a stop surface that engages a portion of the drive shaft when the clamp is closed. A plurality of roller bearings or bushings allow for linear motion of the clevis which is translated into rotary motion by the drive shaft. This rotary motion then moves a clamp arm, via an attachment to an end of the drive shaft. The drive shaft will form a wedge lock between the stop block and an inner portion of the body of the clamp. The clamp also includes a switch box and associated electronic components therein. A cover plate is arranged on one end of the body and seals the internal components of the clamp from contamination by contaminates found in the manufacturing environment. The power clamp is capable of being attached to robots, tools, machinery and other components by various orifices, contours and shapes on the outside surface of the body of the clamp.

BRIEF DESCRIPTION OF THE DRAWINGS

FIGS. 1A-D show an exploded view of a power clamp according to the present invention and an end view, side view, and top view of the clamp.

FIGS. 6A & B show a side view and end view of the alternate embodiment of the power clamp.

FIG. 7 shows a cutaway view of the alternate embodiment of the power clamp.

FIG. 8 shows a cross section of the alternate embodiment of the power clamp.

FIG. 9 shows a cutaway view of the alternate embodiment of the power clamp.

FIG. 10 shows a cross section of the alternate embodiment of the power clamp.

FIG. 11 shows a side view of an alternate embodiment of the power clamp.

FIG. 12 shows a side open view of the power clamp according to FIG. 11.

FIG. 15 shows an end view of the extruded body of the clamp of FIG. 11.

FIG. 16 shows an end view of the power clamp of FIG. 11 with a cover removed for clarity.

FIG. 17 shows a top view of a rotator pin for use in the clamp of FIG. 11.

FIG. 18 shows a side view of the rotator pin for use in the clamp shown in FIG. 11.

Figure 1A:
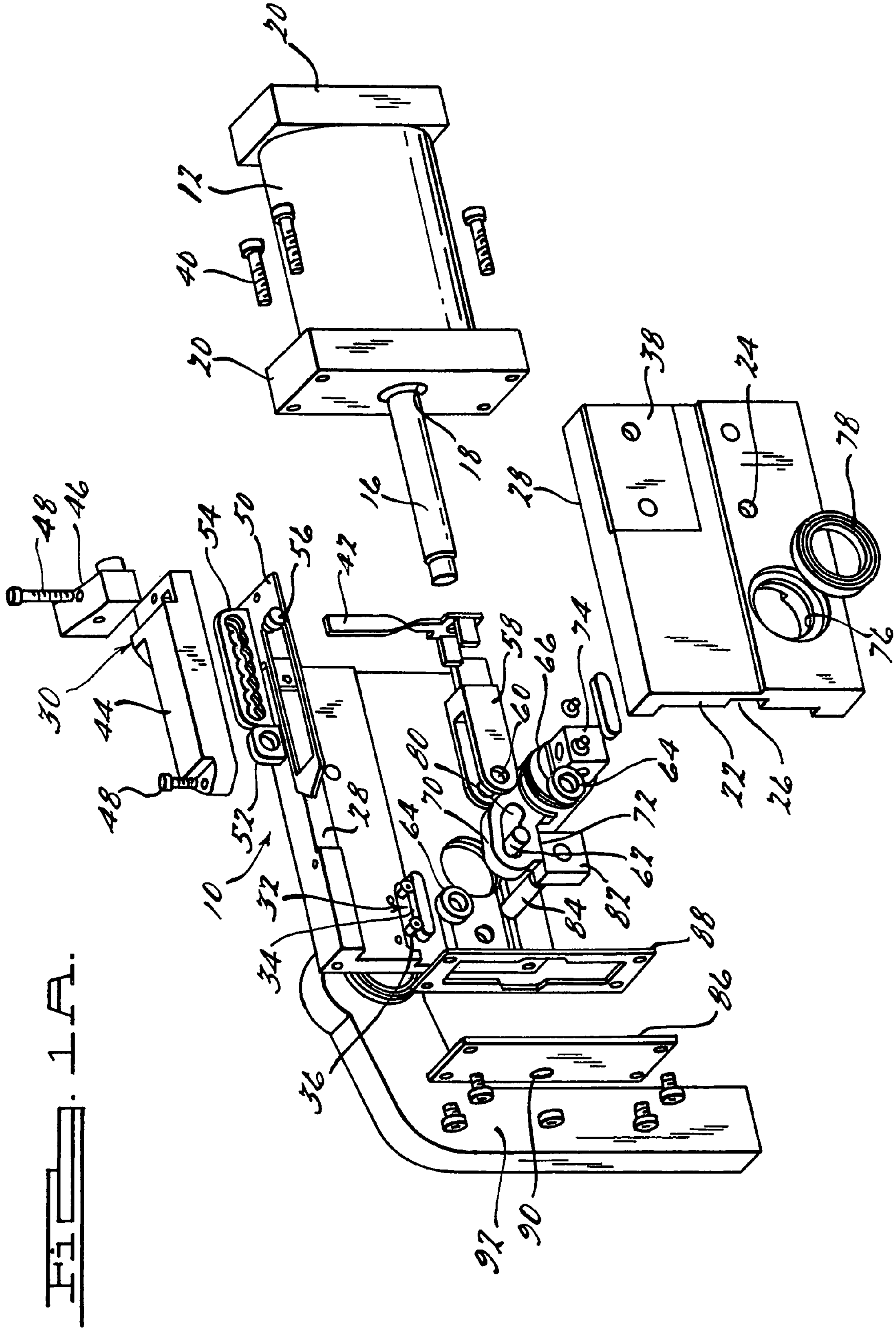
Figure 2:
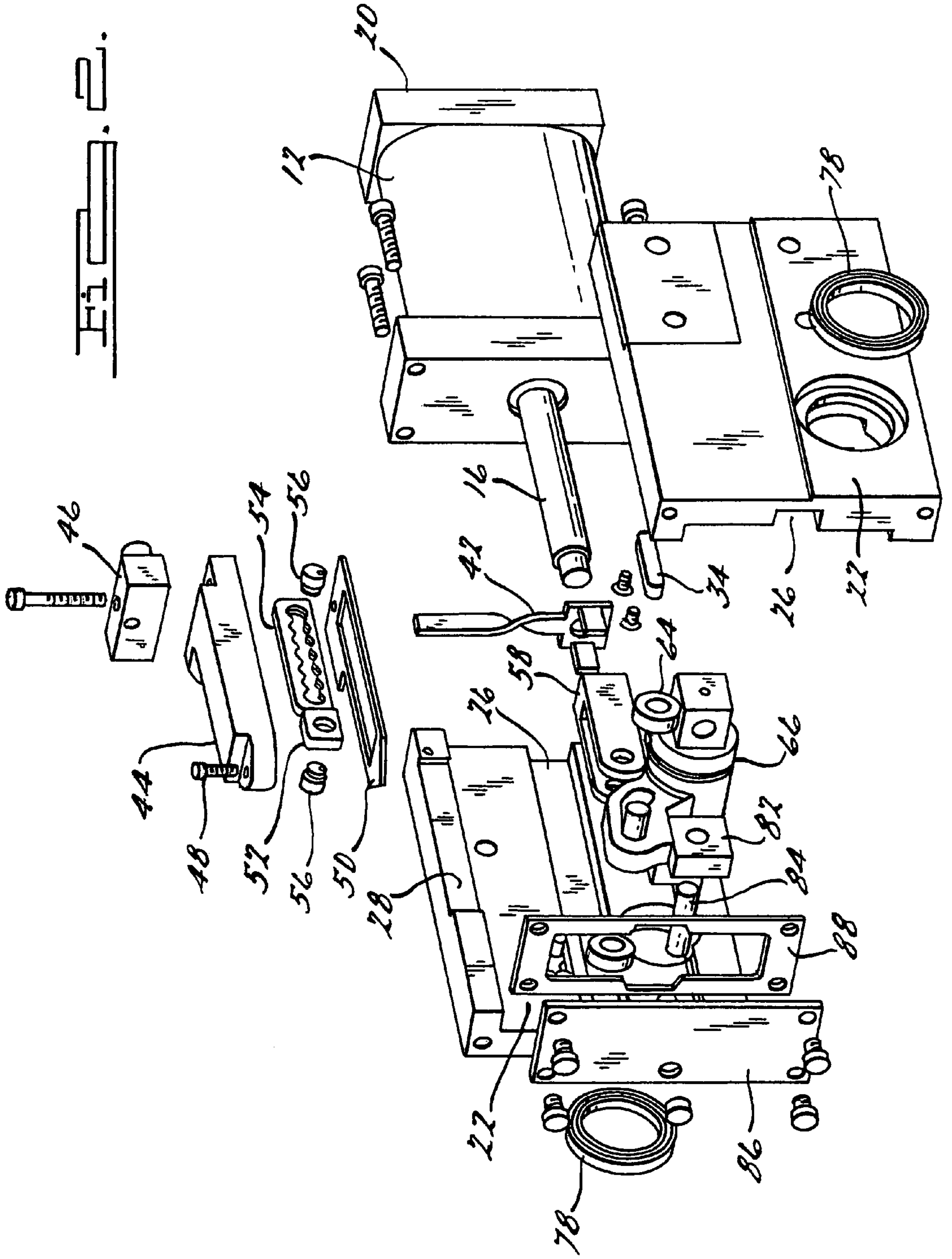
FIG. 2 shows an exploded view of a power clamp according to the present invention.

DESCRIPTION OF THE PREFERRED EMBODIMENT(S) AND BEST MODE FOR CARRYING OUT THE INVENTION

Referring to the drawings, FIGS. 1-4 show a power clamp 10 according to the present invention. It should be noted that the power clamp 10 shown in FIGS. 1-4 uses a wedge lock clamp action system. However, it should be noted that a toggle clamp action system may also be used for the present invention, an example of such a clamp is shown in FIGS. 5-10. It should also be noted that any other type of clamp known may use the features of the present invention therein including but not limited to pull clamps, hold down clamps, squeeze clamps, electronic clamps, hydraulic clamps, pneumatic clamps, or any other known clamp.

The power clamp 10 according to the present invention includes a cylinder 12. In the embodiment shown the cylinder 12 is an air cylinder however, it should be noted that any other type of gas, liquid, mechanical, electronic, magnetic, or any other known cylinder which is capable of creating a linear motion may be used in conjunction with the power clamp 10 of the present invention. The cylinder 12 generally has a round, rectangular or oval shape and includes a bore therein. Slidingly arranged within the bore is a piston 14. The piston 14 generally has a shape that mimics the shape of the inner bore of the cylinder 12. A piston rod 16 is secured to the piston 14 at mid-point thereof and extends from one end of the cylinder 12 through an orifice 18 of an end plate 20 of the cylinder 12. The piston rod 16 is capable of linear movement with respect to an end of the cylinder 12. The cylinder 12 may also include the necessary orifices to attach to other components of the power clamp 10. The cylinder 12 may also include other orifices or mounting holes to allow mounting of the power clamp 10 in predetermined arrangements within the manufacturing environment. It should be noted that the cylinder 12 is generally made of any known steel or aluminum material however, it should be noted that any other metal, ceramic, plastic, fabric, composite or the like may be used to create the cylinder 12, piston 14 and piston rod 16 for the present invention.

The power clamp 10 also includes a body member 22. The body member 22 in the present invention is an extruded steel or aluminum part. However, it should be noted that any other extrudable material such as any other metal, plastic, ceramic, composite, or the like may be used for the body 22. In the embodiment shown the body 22 includes a first body half and a second body half which generally have a C-shaped cross section and a generally rectangular overall shape. The body members 22 have a plurality of orifices 24 therethrough for connecting to other components of the power clamp 10 or for mounting of the power clamp 10 to various tools or robots within a manufacturing environment. Generally, the orifices 24 have a circular shape however, any other size or shaped orifice may be used for the body members 22. It should also be noted that the body members 22 are generally mirror images of each other and when secured to one another form a generally rectangular shaped cross-section through the body 22. The body members 22 each include a channel 26 located along a midpoint of an inner wall of the body 22. The body members 22 also include a cutout portion 28 which will align with a cutout portion 28 on the opposite body member 22 to create a generally rectangular shaped orifice through a surface of the body 22. The rectangular shaped orifice will have a switch 30 arranged therethrough. The body members 22 also will include a predetermined shaped notch or cavity 32 in the channel 26 of the bodies 22. The notch 32 is used for holding an insert member 34 which will provide a reinforced surface to create a wedge lock system for securing the clamp 10 in its clamped/closed position. The insert 34 will be shaped such that it mimics the shape of the notch 32 and is secured in place via at least one fastener 36. It should be noted that any type of fastener 36 may be used but in the embodiment shown a set screw is the fastener 36. The body 22 may also include a plurality of cut outs 38 or other prearranged shapes on the outer portion thereof for easy connection to work tools, work pieces or robotic machinery in the manufacturing environment. The body 22 is connected to the cylinder 12 on one end thereof. A plurality of fasteners 40 are used to secure the cylinder 12 to the end of the body 22. The body 22 and cylinder 12 are arranged such that the piston rod 16 will align with the channels 26 of the inner surface of the inner bore of the body 22.

FIGS. 5-10 show an alternate embodiment of the power clamp 110. Similar numerals represent similar parts. The body 122 is a single extruded piece body. The body 122 has a generally U-shaped cross section. The open portion of the body 122 is covered by a plate, switch or may even be left open. The orifices 123 in the body 122 are drilled therein. It should also be noted that the orifices 123 may be machined, cast, or even extruded therein. The body 122 functions and includes many parts that are the same as those disclosed above.

The switch 30 of the present invention includes a switch stick or sensor target 42 that is arranged at an end of the piston rod 16. The switch stick 42 may have any shape that is capable of passing through the rectangular orifice in the surface of the body 22. The switch stick 42 extends through the surface of the body 22 and into a switch box cover 44. The switch 30 includes an electronic box member 46 which is secured to the switch box 44 by any known fastener. The switch box 44 is secured to a surface of the clamp body 22 by any known fastener 48 and includes a gasket 50 arranged between a bottom of the switch box 44 and the surface of the body 22. The switch 30 also includes a switch block 52 which defines the clamped/closed position of the clamp 10 for the switch 30. A switch position block 54 which includes a plurality of circular orifices arranged and aligned one next to the other to allow for proper location of the switch when the clamp 10 is in its opened position. Electronic switches 56 are arranged within the switch block 52 and within the switch position block 54. The switch block switch 56 will allow for the user to know when the clamp 10 is in its closed or clamped position. While the switch 56 located within the switch position block 54 will allow for the user to know when the clamp 10 is in its open or unclamped position. One of the switches 56 is arranged within the orifice of the switch block 52 while the second switch 56 is located within any of the plurality of orifices located in the switch position block 54. The switch 56 in the switch position block 54 is located to identify when the clamp 10 is in its fully opened or unclamped position. It should be noted that when the switch stick 42 is in contact with either switch 56 the circuit will be closed thus allowing for notification to occur in some form or another. The switch 56 in the switch position block 54 may be moved to accommodate different linear positions which relate to the piston rod to identify the predetermined position of the clamp 10 in its fully opened position. In operation the switch stick 42 will come in contact with the switch 56 in the switch block 52 when the clamp 10 is in the fully clamped/closed position. Then when the clamp 10 is fully open the switch stick 42 will come in contact with the switch 56 in the switch position block thus completing the circuit and indicating to the user of the clamp 10 that the clamp 10 is in its fully opened position and it is safe to remove the work piece that was being clamped. Any known electronic circuitry will be used in the electronic box member 46 thus allowing for either an audible sound, a visual identification of the clamp position or the transfer electronically via wiring or a wireless system to a computer or a hand held device thus identifying to user of the line on which the clamp is located that the clamp 10 is either in its appropriately closed position or appropriately opened position. It should be noted that the switch box cover 44 and the switch components are generally made of a metal material however, any other plastic, ceramic, composite, fabric or the like material may be used.

A clevis 58 is arranged on an end of the piston rod 16. The clevis 58 is arranged such that the switch stick 42 is located between a surface of the piston rod 16 and a surface of the clevis 58. The clevis 58 is fastened to the end of the piston rod 16 by any known fastening technique including but not limited to a threaded fastening mechanism, a snap ring mechanism or any other type of clamping or fastening mechanism known. The clevis 58 generally has a U-shape with an orifice 60 through each end thereof and an orifice through which it is connected by any known securing means to the end of the piston rod 16. The clevis 58 will have a dowel 62 arranged in the orifices 60 at the end of the clevis 58 with a roller bearing 64 arranged on each end of the dowel 62 at or near an outside surface of the clevis 58. The clevis 58 is arranged within the body 22 of the clamp 10 such that the bushing 64 will roll along the first and second channels 26 located on the inside surface of the body 22. It should be noted that the clevis 58 is generally made of steel material however, any other know metal, ceramic, plastic, composite, or the like may be used for the clevis 58.

A drive shaft 66 generally having a body 68 and an appendage 70 extending from a portion of that body 68 is arranged within the cavity of the clamp body 22. The appendage 70 has a predetermined angle from a center line of the drive shaft body 68. The appendage 70 also includes a shoulder 72 that creates a stop for the power clamp 10. The drive shaft 66 generally has a cylindrical shape for its body and includes a square end portion 74 on each end of the drive shaft 66. The drive shaft 66 is arranged in drive shaft orifices 76 located through sides of the clamp body 22. Sealed ball bearings 78 are arranged within the orifices 76 of the clamp body 22 with the drive shaft 66 arranged within the ball bearings 78. This will allow for the drive shaft 66 to rotate with respect to the clamp body 22 and hence power clamp 10. Any known ball bearing 78 or other type of bearing or bushing may be used in the orifice 76 of the clamp body 22. The drive shaft 66 is generally a solid member but may be designed to include a hollow orifice therein to reduce weight for the clamping mechanism. A track 80 is located in the appendage 70 of the drive shaft 66 and is arranged such that the dowel 62, arranged in the clevis 58, is place through the track 80 and allows for the drive shaft 66 to be connected to the clevis 58 which is located on an end of the piston rod 16. It should be noted that the clevis 58 is arranged around the outside of the appendage 70 of the drive shaft 66 hence, the drive shaft 66 is arranged within the U-shaped portion of the clevis 58. It should be noted that a toggle clamp may also be used according to this present invention. It should be noted that the drive shaft 66 is generally made of a steel material however, any other known metal, plastic, ceramic or composite may be used depending on the design requirements of the power clamp 10. The track 80 of the appendage 70 is designed to allow for rotation of the drive shaft 66 and eventual locking of the clamp 10 in the closed position through a wedge lock action. Therefore, the track 80 in the appendage 70 generally has an L-shape. Within this L-shape each of the legs of the L has a predetermined angle with respect to the channel 26. This will insure that a wedge action occurs when the clamp 10 is in its fully closed position.

It should be noted that an alternate design for the driveshaft 166 is shown in FIGS. 5-10. The alternate drive shaft 166 is multi-piece driveshaft 166. The driveshaft 166 includes a shaft 167 arranged within bushings 169. The shaft 167 may be hollow or solid and have a generally square cross section, however any other shape may also be used. An appendage or arm 171 is arranged around the shaft 167. The arm 171 includes a fastening mechanism which will secure the arm 171 to the shaft 167 and a link 173. The link 173 is also connected to clevis 158 to allow for toggle of the clamp. At least one roller 175 is arranged between the clevis 158 and body 122. It should be noted that the roller 175 may be arranged at different areas within the body 122.

A stop block 82 is arranged around a stop pin 84. The stop pin 84 is arranged within orifices located on the inside surface of the clamp body 22. The stop block 82 generally has a square cross section with a circular orifice through a mid-point thereof. The stop block 82 is arranged such that it interacts with and engages the shoulder portion 72 of the appendage 70 on the drive shaft 66 when the clamp 10 is in its closed position. The shoulder portion 72 of the appendage 70 of the drive shaft 66 will engage with a surface on the stop block 82 thus putting the clamp arm 92 into its closed position at a predetermined angle with respect to the clamp body 22. Therefore, in operation a wedge action will lock the clamp 10 into its fully closed position by creating a wedge force which will ensure that the shoulder portion 72 and the stop block 82 of the present invention do not disengage from one another. The wedge force is created by the dowel 62 engaging and inserting a force on the appendage 70 of the drive shaft 66 via the appendage track 80 and the channel 26 of the clamp body 22 via the bushings 64. This force is created by having a predetermined upward angle on the appendage channel or track 80 which will increase with relation to the channel 26 on the inner surface of the clamp body 22. This will create a downward force through the appendage 70 and shoulder portion 72 onto the stop block 82 thus creating a wedge force to hold the clamp 10 in its fully closed or clamped position. The clamp force created between block 82 and shoulder portion 72 is such that block 82 and shoulder portion 72 engage at surfaces that are parallel or aligned with each other. This will help reduce over forces which may restrict opening of the clamp if the clamp is put into a closed or stuck position. It should be noted that the stop pin 84 and stop block 82 are generally made of a steel material however, any other known metal, plastic, ceramic, composite or the like may be used for the stop pin 84 and stop block 82.

A cover plate 86 is arranged on an end of the clamp body 22 opposite that of the cylinder 12. A gasket 88 is arranged between the cover plate 86 and the body 22 to create a seal that will not allow contaminates to enter the clamp and contaminate the internal components of the power clamp 10 from the manufacturing environment. It should be noted that an access hole 90 may be arranged through the cover plate 86 to allow for access to the internal components and/or lubrication of the internal components of the power clamp 10 after assembly thereof.

The clamp arm 92 is connected on one or both sides of the clamp 10 via an orifice therein. The clamp arm 92 is arranged over the end of the drive shaft 66 that extends from the side of the clamp body 22. The clamp arm 92 is arranged over the square end portion 74 of the drive shaft 66 and is fastened with any known fasteners to the drive shaft 66. This will allow the clamp arm 92 to swing from its fully opened position to its fully closed position depending on the action needed in the manufacturing environment.

Figure 3A:
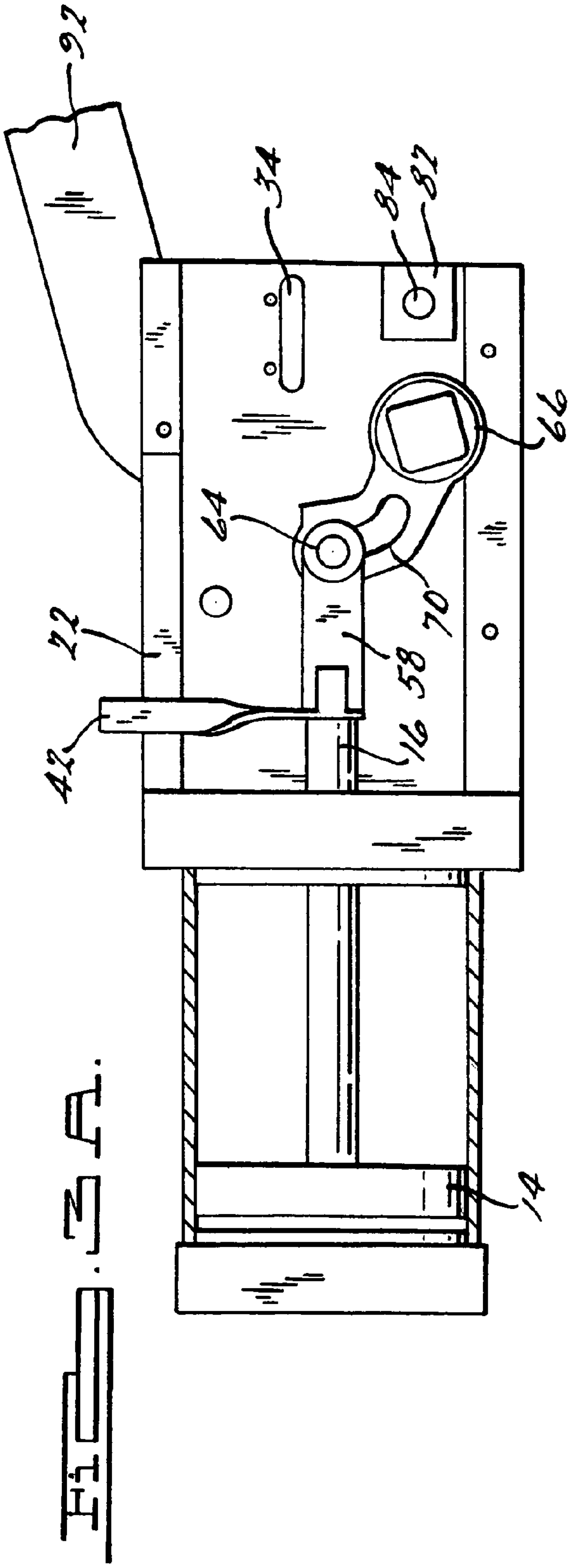
FIGS. 3A & B show a cross section of the clamp according to the present invention with the clamp in an open and closed position.
Figure 3B:
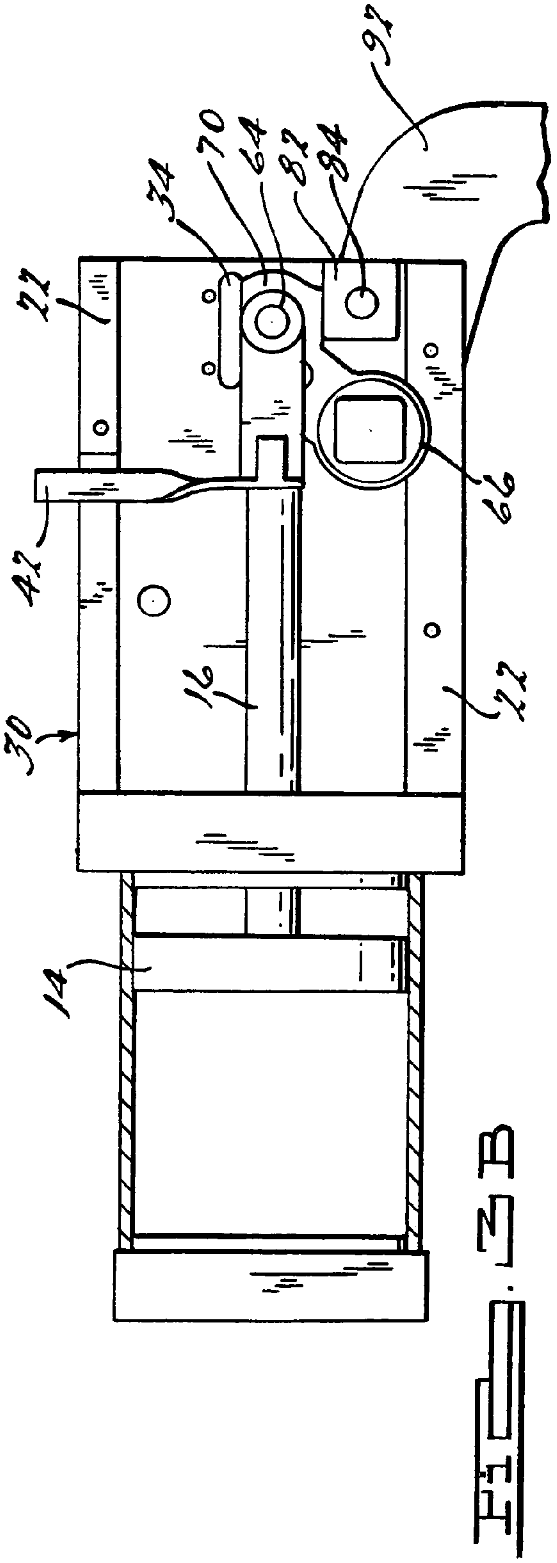
Figure 4A:
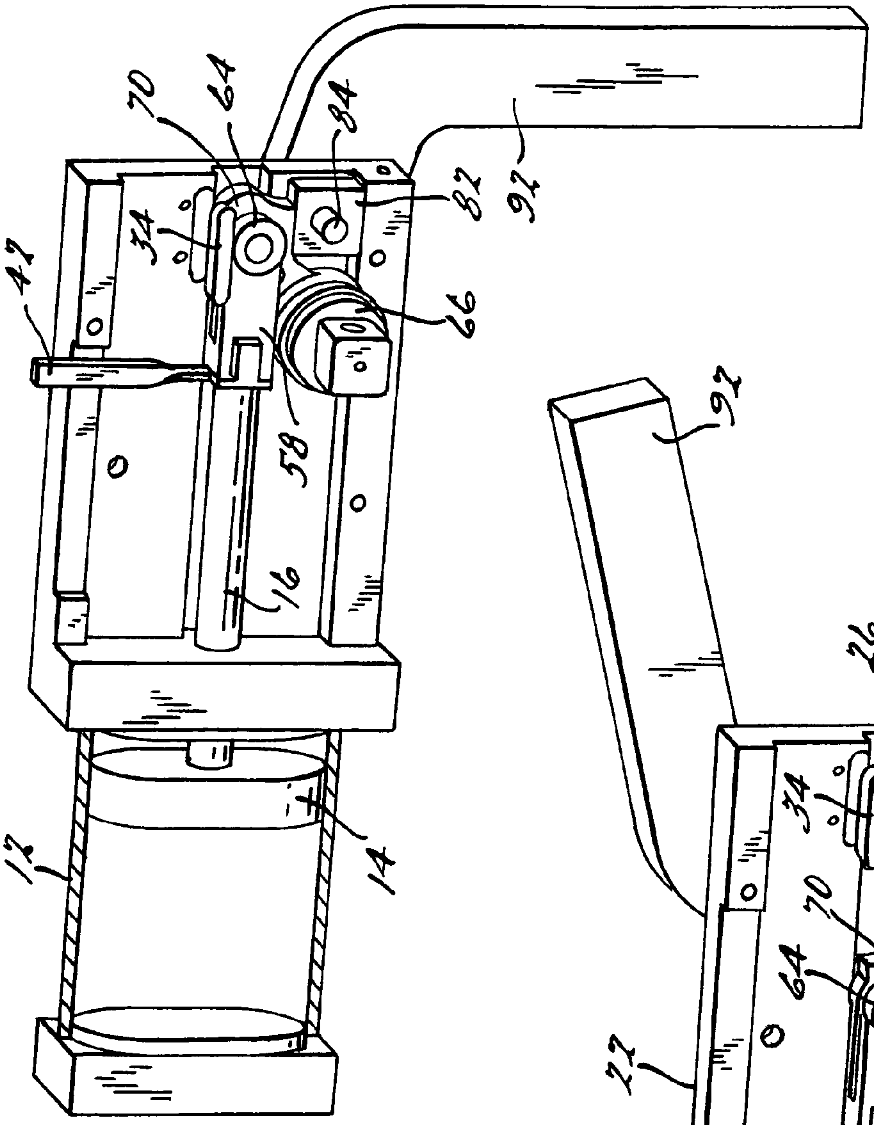
FIGS. 4A & B show a partial cut away view of the clamp according to the present invention in an open and closed position.
Figure 4B:
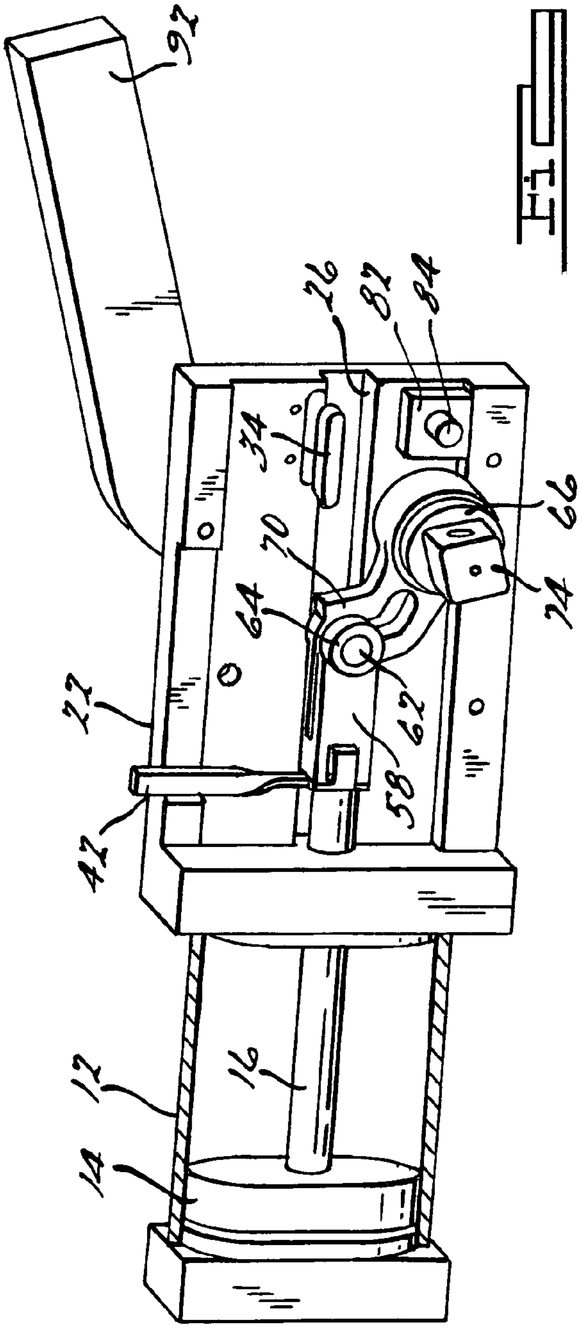
Figure 5:
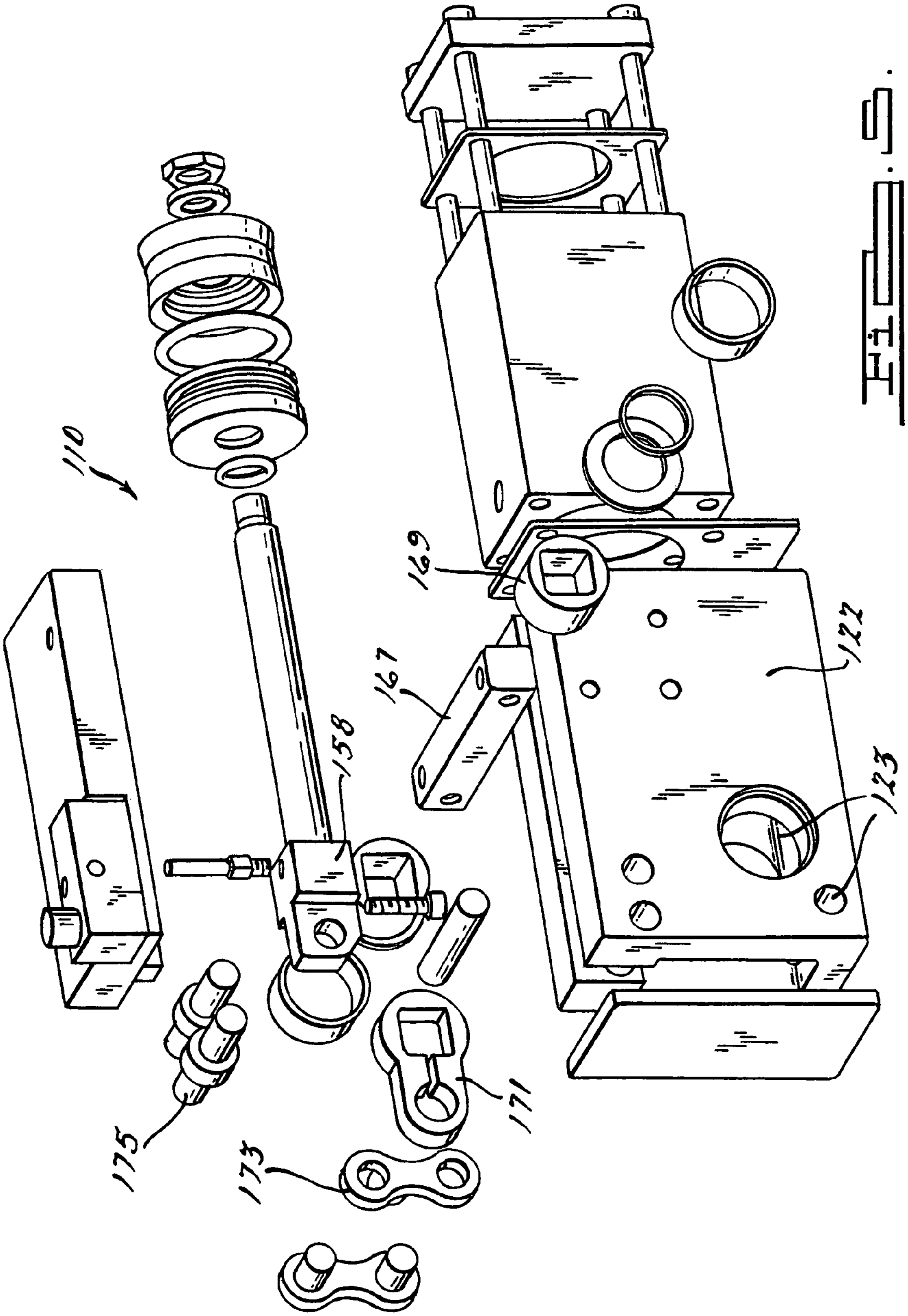
FIG. 5 shows an exploded view of an alternate embodiment of a power clamp according to the present invention.
Figure 13:
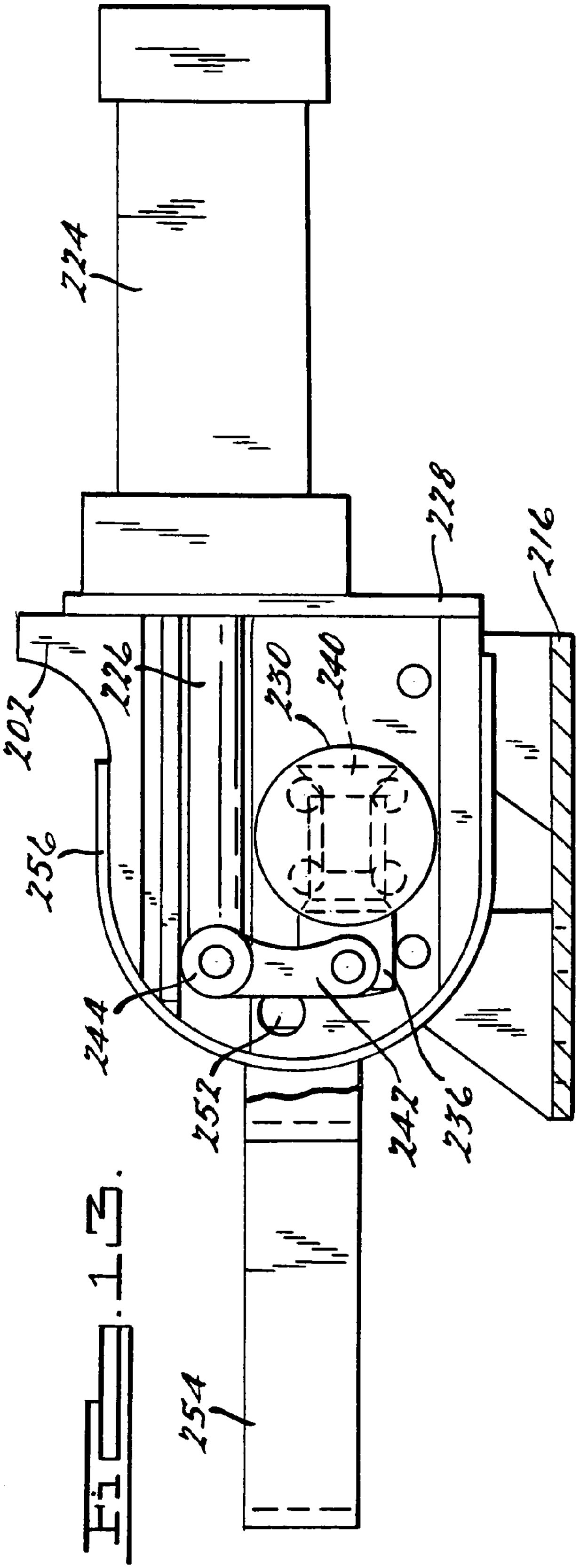
FIG. 13 shows a side open view of the clamp according to FIG. 11 in the clamped position.
Figure 14:
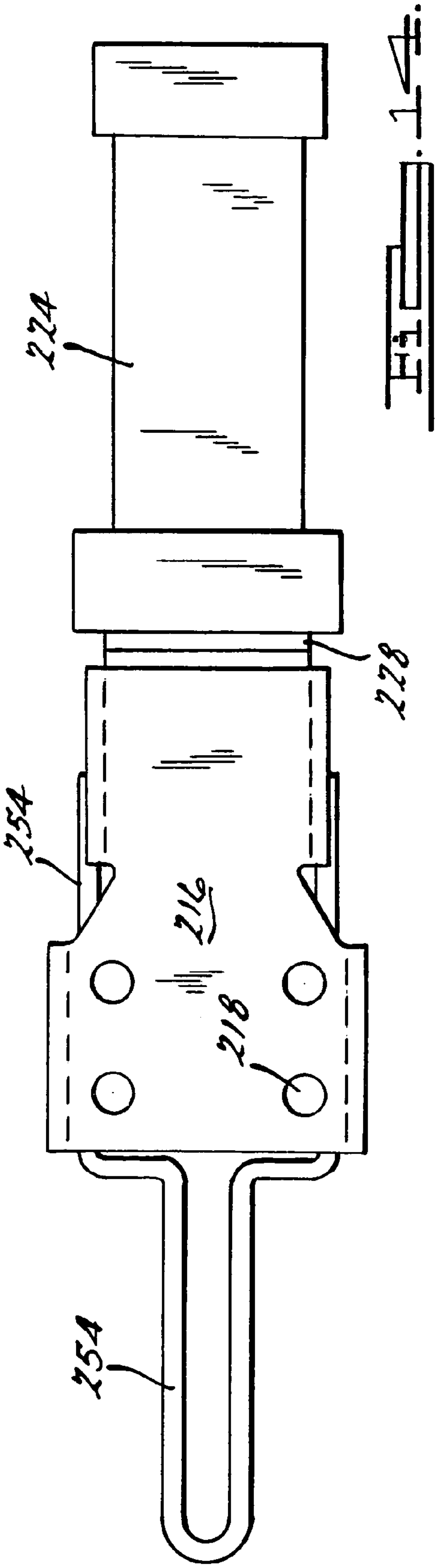
FIG. 14 shows a bottom view of the clamp of FIG. 11.

FIGS. 3 and 4 show the clamp 10 in both an open position and a closed or clamped position according to the present invention. As shown in FIGS. 3 and 4, when the clamp 10 is in its closed position the bushing or roller bearing 64 engages the top surface of the channel 26 or insert 34 depending on if the body is hardened steel, aluminum or steel. If the body is extruded from aluminum or steel then the insert 34 would be a hardened steel material thus allowing for a stronger surface for which the bushing 64 will engage with. This will help create the wedge force between the dowel 62 and the appendage 70 of the drive shaft 66. This wedge will insure that the shoulder portion 72 and stop block 82 do not come disengaged when the clamp 10 is in its closed position. As noted above the arm 92 may be a straight arm, may have an L-shape as shown in FIGS. 3 and 4 or may have a U-shaped arm which is connected to both ends of the drive shaft 66 and may include a single action arm extending from a U-shaped portion.

In operation the clamp 10 will move between its opened or closed position via the piston 14 being activated in the cylinder 12 by any known force such a pneumatic force, hydraulic force, electronic force, mechanical force, or the like. The 10 clamp in its fully closed position will have a wedge lock action thus insuring that the clamp 10 stays fully closed until the piston 14 is reversed into an opposite linear direction thus allowing the clamp arm 92 to open and release the work piece in the manufacturing environment. The power clamp 10 of the present invention has many advantages over the prior art including a reduction in assembly time, cost, and an increase in durability. The linkage mechanism also includes fewer parts thus reducing the cost in making and assembling the power clamp 10. The power clamp 10 also increases its holding strength and robustness by using an extruded body member 22 which also reduces the cost by reducing the need to machine the body members for the clamp 10. Furthermore, the costs are reduced by using premade cylinders 12 to create the linear motion needed to operate the power clamp 10. A wide variety of shapes and sizes of the clamp 10 are also possible because of the extruded body members being used in conjunction with premade cylinders 12. However, it should also be noted that machined or cast body members may also be used for the present invention. It should also be noted that in the embodiment shown a two piece extruded body is shown but that a single piece extruded body is also contemplated to be used with the present invention.

FIGS. 11 through 18 show another alternate embodiment of a power clamp 200 according to the present invention. The power clamp 200 includes an extruded body 202. The extruded body 202 has a predetermined shaped orifice, bore, or chamber 204 through an entire length thereof. In the embodiment shown the extruded body 202 generally has a T-shaped orifice 204 therethrough. The T-shaped orifice 204 has a first section 206 that has a predetermined width, a second section 208 that has a predetermined width, and a third section 210 that has a predetermined width. The third section 210 has a width that is greater than that of the second section 208, while the second section 208 has a width that is greater than that of the first section 206. A combination of these widths generally give a T-shaped appearance to a cross section of the orifice 204 through the entire length of the extruded body 202. However, it should be noted that any other shaped orifice may be used depending on the design requirements of the power clamp 200. The body 202 can have a generally square shape, rectangular shape, a curved shape or any other known shape depending on the design requirements of the power clamp 200. In the embodiment shown it has a flat end on one end thereof and a curved end on the opposite end of the extruded body 202. The extruded body 202 also may include a plurality of orifices which are generally circular in shape through an entire width thereof. These orifices will be used to connect various components to the clamp 200 or to connect the clamp to end effectors, machines or other components in the manufacturing environment. The extruded body 202 maybe extruded as one piece or as two identical halves.

The clamp 200 may include a base having a plurality of support members 214 extending therefrom. The base 212 is secured to each side of the body 202. It should be noted that the clamp 200 may be used without the base 212 in some contemplated embodiments. The base 212, shown in FIG. 11, includes four support members 214 generally extending at a 90° angle from a bottom surface 216 thereof. The bottom surface 216 will have a plurality of orifices 218 therethrough. Two of the support members 214 will have a generally circular orifice 220 through a predetermined position thereof. The other two support members 214 generally will have a notch or slot 222 arranged at a predetermined position thereof. It should be noted that any variety or combination of slots 222 and orifices 220 through the support members 214 of the base 212 may be used depending on the design requirements for the power clamp 200. The design of the base 212 will be removable from the power clamp 200 and allow for easy connection of the power clamp 200 to industry standard machines, end effectors, and the like.

The clamp 200 also includes a cylinder 224 which has a piston and a rod 226 arranged therein. The cylinder 224 may be of any of the type described herein. The cylinder 224 is offset from a center point or line of the extruded body 202 and/or orifice 204 therethrough. This will allow the rod 226 to be arranged within the second width section 208 of the orifice 204 of the extruded body 202. In the embodiment shown a back plate 228 is arranged between a surface of the cylinder 224 and the flat end of the extruded body 202. The plate 228 will have a plurality of orifices therein to allow for a connection of the cylinder 224 and allow for linear movement of the rod 226 into the orifice 204 of the extruded body 202. It should be noted that the cylinder 224 may also be arranged at other predetermined positions on the end of the extruded body 202 depending on the configuration of the orifice 204 through the length of the body 202.

A main shaft or drive shaft 230 is rotatably arranged within a large orifice through a width of the body 202. The main shaft 230 generally is one-piece and has a cylindrical shape. The main shaft 230 has a predetermined size orifice 232 generally located at or near a mid point thereof through a diameter thereof. The main shaft 230 also includes a plurality of orifices 234 arranged into each end a predetermined depth. The orifices 234 generally are threaded within the end of the shaft 230. The shaft 230 is arranged within the body 202 such that the shaft 230 extends out a predetermined distance from each side of the extruded body 202. The shaft 230 also passes through a portion of the first width section 206 of the orifice 204 of the extruded body 202. The main shaft 230 rotates with respect to the body 202 of the clamp 200.

A rotator pin 236 is arranged within the orifice 232 through the diameter of the main shaft 230. The rotator pin 236 will have an orifice 238 a predetermined depth into one end thereof. The orifice 238 is generally threaded in the end of the rotator pin 236. A fastener 240 of any known type is threaded into the orifice 238 of the rotator pin 236 via one end of the orifice 232 through the diameter of the main shaft 230. This will rotatably secure the rotator pin 236 to the main shaft 230 and will allow for the rotator pin 236 to rotate with the main shaft 230 with relation to the extruded body 202 wherein the rotator pin 236 also rotates within the orifice 204 of the extruded body 202. The rotator pin 236 has a reduced shoulder section on one end thereof which allows for the pin 236 to connect to a link member 242 on both sides thereof.

The clamp 200 also includes a link member 242 pivotally connected to the rotator pin 236 on one end thereof and to the rod 226 of the cylinder 224 on the opposite end thereof. The link member 242 used in FIG. 11 generally has an oval shape with a curved surface on one side thereof. However, any other known shape can be used for the link member 242. In the embodiment shown a first and second link member 242 are used, however one link member 242 is also contemplated to be used in the invention. The link member 242 will allow for rotation of the rotator pin 236, via linear movement of the rod 226, with relation to the extruded body 202 of the clamp 200. The rotator pin 236 will rotate through the first width section 206 of the orifice 204 of the body 202 and the second width section 208 of the orifice 204 of the body 202. A first and second roller 244 is arranged within the second width section 208 of the extruded body orifice 204. The roller 244 is connected via any known fastening member 246 to an end of the link members 242 and the end of the rod 226. As shown in the Figures the rollers 244 are directly adjacent to the outer surface of the first and second link members 242. The first and second link members 242 are arranged between the roller 244 on one side thereof and the rod 226 on the other side thereof. The rollers 244 will roll along the second width section 208 of the orifice between a clamped position of the clamp 200 and an open position of the clamp 200. When the clamp 200 is in a generally open position the link members 242 will be generally parallel with the rod 226. When the clamp 200 is in its clamped position the link members 242 will generally be perpendicular to the rod 226.

Arranged within the third width section 210 of the orifice 204 of the extruded body 202 is at least one plate member 248 and in the embodiment shown a second plate member 250. One of the plate members 248 generally is made of steel and will contact the rollers 244. Arranged between the first plate member 248 and a top portion of the body 202 may be a second plate member 250 which in the embodiment shown is made out of polyurethane or any other plastic material. However, it should be known that only one plate member may be arranged within the third width section 210 or a plurality of bar members depending on the design requirements of the clamp 200.

A stop member 252 is arranged within an orifice of the body 202 such that it extends within or through the first width section 206 of the orifice 204 through the length of the extruded body 202. The stop member 252 shown in FIG. 11 is a generally cylindrical fastener shape but also includes a flat surface that contacts the flat surface of the link members 242 when the clamp 200 is in its clamped position. This will create a stop for use in either a toggle mechanism or a wedge mechanism in the clamp 200. It should be noted that any other shaped stop member or stop surface may be used in the clamp 200 and the use of a pin like stop member does not restrict or limit such disclosure.

The clamp 200 also includes a bar member 254 that is secured to the main shaft 230 on both ends thereof. Any known fastener is used to connect the bar member 254 into the predetermined depth orifices 234 in each end of the main shaft 230. The bar 254 includes an end portion that may have a general U-shape or any other known shape that will be moved from a generally parallel position with respect to the rod 226 to a generally perpendicular position with respect to the rod 226 between its clamped and open positions. This gives approximately 90° of movement between the clamped and open position for the power clamp 200 according to FIG. 11. The bar 254 may also have any shape and may also only be connected to one side of the shaft 230 depending on the design requirements and the strength required from the bar 254 in the application for which the power clamp 200 will be used.

The power clamp 200 also includes a cover 256 which generally has a U-shape. The cover 256 is placed over the curved surface of the extruded body 202 and secured via any known fastener into predetermined placed orifices in the extruded body 202. The cover 256 will isolate the inner clamp components from the external environment of the manufacturing line thus increasing durability and reducing down time of the clamp 200 due to weld slag and other contaminates found in the manufacturing environment. It should be noted that if the clamp 200 has a shape other than a curved surface a cover 256 fitting such a shape or an end plate such as that used on the opposite end of the clamp 200 may be used to cover the inner components of the body 202 of the power clamp 200. It should be noted that in general most of the components discussed for FIG. 11 are made of a steel or any other metal material, however it should be noted that any hard ceramic, plastic, composite, or like material may also be used to make the power clamp 200. The power clamp 200 operates in generally the same way as that described above for the other embodiments of this power clamp 200 according to the present invention.

While it may be apparent that the preferred embodiment and the invention disclosed is well calculated to fill benefits, objects or advantages of the present invention, it should be appreciated that the invention is susceptible to modifications, variations and change without departing from the proper scope of the invention as shown.

What is claimed is:

1. A power clamp, said clamp comprising:
- an extruded body having a generally T-shaped cross section orifice along an entire length thereof;
- a cylinder having a rod secured to said body;
- a shalt rotatably supported by said body;
- a bar connected to said shaft;
- an appendage engaged with said shaft; and
- a link member connected to said appendage on one end and said rod on an opposite end.

2. The clamp of claim 1 further comprising a cover ranged over a portion of said body.

3. The clamp of claim 1 further comprising a base secured to said body, said base having a plurality of supports, at least one of said supports having an orifice therein and at least one of said supports having a slot therein.

4. The clamp of claim 3 wherein said base is removable from said body.

5. The clamp of claim 1 wherein said body having a generally circular orifice through a width thereof.

6. The clamp of claim 5 wherein said shaft is arranged within said circular orifice.

7. The clamp of claim 1 wherein said shaft having an orifice arranged through a diameter thereof.

8. The clamp of claim 7 wherein said appendage arranged in one end of said orifice, said appendage having a predetermined depth orifice in one end thereof, a fastener secured in said appendage orifice via the other end of said orifice of said shaft.

9. The clamp of claim 8 wherein said appendage is rotatably fixed with respect to said shaft within said body.

10. The clamp of claim 1 further comprising a stop member arranged within said body, said link contacts said stop member when said bar is in a clamped position.

11. The clamp of claim 1 wherein said shaft having a plurality of orifices in each end thereof.

12. The clamp of claim 1 wherein said cylinder is offset a predetermined distance from a centerline of said body.

13. The clamp of claim 1 wherein said body orifice having a first width section, a second width section, and a third width section, said third width section has a width greater than said second width section, said second width section has a width greater than said first width section.

14. The clamp of claim 13 wherein a roller is arranged within said second width section, said rod is arranged within said second width section.

15. The clamp of claim 13 further comprising at least one plate arranged within said third width section.

16. The clamp of claim 1 further comprising a back plate arranged between said cylinder and said body.

17. A power clamp, said clamp comprising:

an extruded body having a generally modified T-shaped cross section orifice through all entire length thereof;

a base having a plurality of supports, said supports are secured to said body on both sides of said body;

a shaft rotatably supported by said body, said shaft extends a predetermined distance from each side of said body;

a bar secured to both sides of said shaft;

a cylinder having a piston and rod ranged therein, said cylinder secured to an end of said body, said rod extends into said T-shaped orifice of said body;

a rotator pin or appendage connected to said shaft, said rotator pin or appendage rotates with said shaft between an open and clamped position;

a link pivotally secured to said rotator pin and said rod;

a stop member arranged within said T-shaped orifice, said stop member contacts said link in said clamped position; and a roller connected to said link and said rod.

18. The power clamp of claim 17 wherein said body having a curved outer surface, a generally U-shaped cover is secured to said body over said curved surface, a back plate arranged between said body and said cylinder, and at least one plate arranged within said T-shaped orifice.

19. An extruded body power clamp for use in manufacturing, said clamp including:

a cylinder connected to said body, said cylinder offset from a center point of the body the body having a generally T-shaped orifice along an entire length thereof;

a one piece drive shaft rotatably supported in the body, said drive shall having an orifice through a diameter thereof; and a two piece rotator pin arranged within said orifice of said drive shaft, said first piece of said rotator pin having an orifice therein, said second piece of said rotator pin arranged within said orifice of said first piece of said rotator pin.

20. The clamp of claim 19 wherein said orifice of said first piece of said rotator pin is threaded, said second piece of said rotator pin having threads on an outside surface thereof, said first piece connected to a link, said link connected to a rod, said rod extending from said cylinder.

* * * * *

UNITED STATES PATENT AND TRADEMARK OFFICE

CERTIFICATE OF CORRECTION

PATENT NO. : 7,314,214 B2
APPLICATION NO. : 11/454580
DATED : January 1, 2008
INVENTOR(S) : Douglas D. Colby et al.

It is certified that error appears in the above-identified patent and that said Letters Patent is hereby corrected as shown below:

Col. 5, Line 26 - Please delete “know” and insert -- known -- after “however, any other”

Col. 5, Line 47 - Please delete “place” and insert -- placed -- after “in the clevis 58 is”

Col. 10, Line 49, Claim 2 - Please delete “ranged” and insert -- arranged -- after “comprising a cover”

Col. 11, Line 24, Claim 17 - Please delete “all” and insert -- an -- before “orifice through”

Col. 11, Line 32, Claim 17 - Please delete “ranged” and insert -- arranged -- after “piston and rod”

Col. 12, Line 21, Claim 19 - Please delete “shall” and insert -- shaft -- after “said drive”

Signed and Sealed this

Third Day of June, 2008

JON W. DUDAS
*Director of the United States Patent and Trademark Office*